United States Patent
Hilnbrand et al.

(10) Patent No.: US 9,944,318 B2
(45) Date of Patent: Apr. 17, 2018

(54) AUTOMATED VEHICLE REAR-WHEEL STEERING SYSTEM

(71) Applicant: DELPHI TECHNOLOGIES, INC., Troy, MI (US)

(72) Inventors: Brian R. Hilnbrand, Mountain View, CA (US); Ludong Sun, Pittsburgh, PA (US)

(73) Assignee: DELPHI TECHNOLOGIES, INC., Troy, MI (US)

( * ) Notice: Subject to any disclaimer, the term of this patent is extended or adjusted under 35 U.S.C. 154(b) by 0 days.

(21) Appl. No.: 15/264,121

(22) Filed: Sep. 13, 2016

(65) Prior Publication Data

US 2018/0072344 A1 Mar. 15, 2018

(51) Int. Cl.
| | |
|---|---|
| *B62D 11/00* | (2006.01) |
| *B62D 15/02* | (2006.01) |
| *B62D 13/02* | (2006.01) |
| *G05D 1/02* | (2006.01) |
| *G08G 1/16* | (2006.01) |

(52) U.S. Cl.
CPC ......... *B62D 15/0265* (2013.01); *B62D 13/02* (2013.01); *G05D 1/0238* (2013.01); *G08G 1/16* (2013.01); *G05D 2201/0213* (2013.01)

(58) Field of Classification Search
CPC .. B62D 15/0265; B62D 13/02; G05D 1/0238; G08G 1/16

USPC .......................................................... 701/41
See application file for complete search history.

(56) References Cited

U.S. PATENT DOCUMENTS

| | | | |
|---|---|---|---|
| 4,848,499 | A | 7/1989 | Martinet et al. |
| 5,201,836 | A | 4/1993 | DeWitt |
| 5,479,999 | A | 1/1996 | Proia |
| 5,938,704 | A * | 8/1999 | Torii .................... G05D 1/0265 180/168 |
| 6,604,753 | B1 | 8/2003 | Boyd |
| 7,793,965 | B2 | 9/2010 | Padula |
| 9,523,984 | B1 * | 12/2016 | Herbach .............. B62D 15/025 |
| 2003/0060959 | A1 * | 3/2003 | Lin ....................... B60T 8/1755 701/70 |
| 2006/0229782 | A1 | 10/2006 | Deng et al. |

FOREIGN PATENT DOCUMENTS

GB 2501167 A 10/2013

* cited by examiner

*Primary Examiner* — Muhammad Shafi
(74) *Attorney, Agent, or Firm* — Lawrence D. Hazelton

(57) ABSTRACT

A rear-wheel steering system suitable for use on an automated vehicle includes an object-detector, and actuator, and a controller. The object-detector is used to detect an object proximate to a host-vehicle. The actuator is used to adjust a rear-steering-angle of rear-wheels of the host-vehicle. The controller is in communication with the object-detector and the actuator. The controller is configured to determine a location of the object relative to the host-vehicle based on information from the object-detector, and operate the actuator to avoid the object when the host-vehicle moves.

2 Claims, 6 Drawing Sheets

AUTOMATED VEHICLE REAR-WHEEL STEERING SYSTEM

TECHNICAL FIELD OF INVENTION

This disclosure generally relates to a rear-wheel steering system, and more particularly relates to a system that determines a location of the object relative to a host-vehicle, and controls the angle of the rear-wheels of the host-vehicle to avoid the object.

BACKGROUND OF INVENTION

It is known to equip vehicles with rear-wheel steering that controls a rear-steering-angle of rear-wheels of a host-vehicle based on a front-steering-angle of front-wheels of the host-vehicle. However, there is still a risk that the host-vehicle may scrape or side-swipe an object located on the inside of a corner turned by the host-vehicle.

SUMMARY OF THE INVENTION

Described herein is a rear-wheel steering system that detects the presence of an object proximate to a host-vehicle, and operates rear-wheel-steering of the host-vehicle so as to avoid contact with, i.e. scraping or side-swiping, the object. That is, the rear-wheel angle is actively adjusted based on the location of the object rather than blindly or passively adjusting the rear-wheel angle based on the front-steering-angle of front-wheels.

In accordance with one embodiment, a rear-wheel steering system suitable for use on an automated vehicle is provided. The system includes an object-detector, and actuator, and a controller. The object-detector is used to detect an object proximate to a host-vehicle. The actuator is used to adjust a rear-steering-angle of rear-wheels of the host-vehicle. The controller is in communication with the object-detector and the actuator. The controller is configured to determine a location of the object relative to the host-vehicle based on information from the object-detector, and operate the actuator to avoid the object when the host-vehicle moves.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
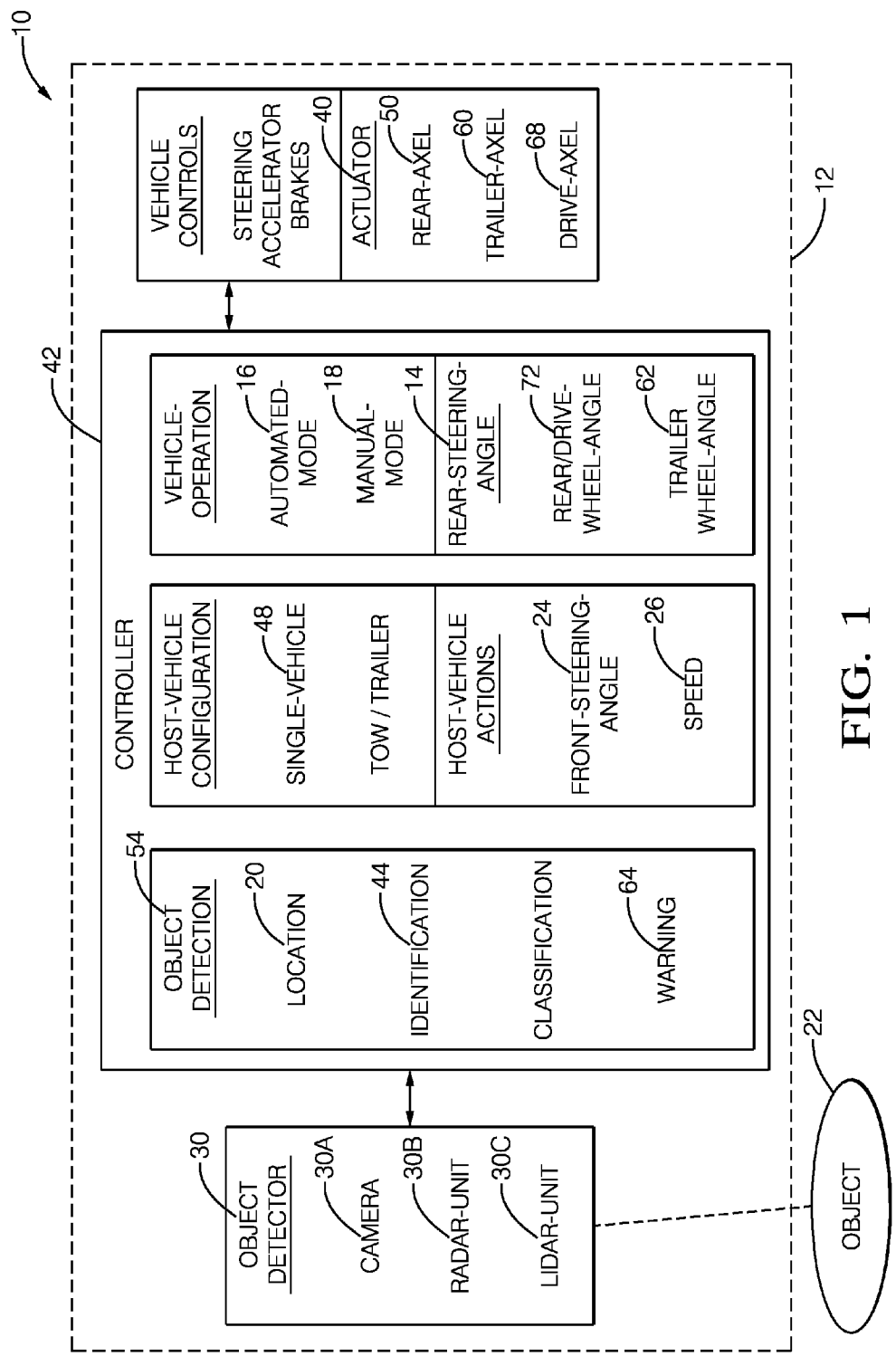
FIG. 1 is a diagram of a rear-wheel steering system in accordance with one embodiment.

FIG. 1 illustrates a non-limiting example of a rear-wheel steering system 10, hereafter referred to as the system 10, which is suitable for use on an automated vehicle, a host-vehicle 12 for example. As used herein, the term 'automated vehicle' is not meant to suggest that fully automated or autonomous operation of the host-vehicle 12 is required. It is contemplated that the teachings presented herein are applicable to instances where the host-vehicle 12 is entirely manually operated by a human-operator (not shown) except for the control of a rear-steering-angle 14 the rear-wheels of the host-vehicle 12. That is, the host-vehicle 12 may be operable in an automated-mode 16 which may be a fully autonomous type of operation where the human-operator does little more than designate a destination, and/or the host-vehicle 12 may be operable in a manual-mode 18 where the human-operator generally controls the steering, accelerator, and brakes of the host-vehicle. As will be described in more detail below, the one aspect of automation of the host-vehicle 12 that is generally required is that the system 10 actively steers the rear-wheels of the host-vehicle 12 based on a location 20 of an object 22 rather than merely passively steering the rear-wheels based only on dynamic variables of the host-vehicle 12 such as a front-steering-angle 24 and/or a speed 26 of the host-vehicle 12.

Accordingly, the system 10 includes an object-detector 30 used to detect the object 22 when it is proximate to the host-vehicle 12, in particular when the location 20 of the object 22 is such that the movement or motion of the host-vehicle 12 may cause the host-vehicle 12 to make contact with (e.g. collide with, scrape, or side-swipe) the object 22. By way of specific non-limiting examples, the object 22 may be a curb 32 (FIGS. 2, 3A-D) that defines the edge of a roadway 34, or a sign, traffic-signal, or telephone-pole 36 near the edge of the roadway 34. Of particular interest is when an instance of the object 22 (e.g. the curb 32 and/or the telephone-pole 36) is proximate to a corner 38 where a tight-radius turn by a vehicle not equipped with the system 10 described herein may cause the rear-wheels to 'jump' the curb 32 at the corner 38, and/or make contact with (i.e. scrap or side-swipe) the telephone-pole 36. While the examples of object above are generally stationary, it is also contemplated that the object 22 could be mobile object such as a pedestrian walking on or near the roadway 34, a person riding a bicycle, or a vehicle moving into or out of a parking place adjacent to the roadway.

The object-detector 30 may be, but is not limited to, a camera 30A, a radar-unit 30B, a lidar-unit 30C, or any combination of single or multiple instances of any of those devices or other devices using suitable detection technologies. As will be recognized by those in the art, the camera 30A may be an advantageous choice to determine the identification 44 of the object 22, where the identification 44 is effective to distinguish the curb 32 from the telephone-pole 36. However, the camera 30A may not be the best choice to determine a distance to the object, which is where the radar-unit 30B and the lidar-unit 30C are considered to have the advantage. As such, it is expected that the combination of the camera 30A and either the radar-unit 30B or the lidar-unit 30C will be a preferred configuration.

In order to make the host-vehicle 12 more maneuverable so instances of the object 22 such as those described above can be avoided, the system 10 includes an actuator 40 used to adjust the rear-steering-angle 14 of the rear-wheels of the host-vehicle 12. The actuator 40 may turn the wheels relative to an axel-line between the wheels similar to how the front wheels are angled on virtually every automobile in use today. Alternatively, the angle of the wheels relative to the axel-line may be fixed, so to change the wheel-angle the entire axel assembly is rotated or pivoted, which can be seen in some limited use on farm equipment, e.g. a hay-wagon.

The actuator may be an electric-motor where rotation of the electric-motor is mechanically coupled to the axel assembly. As another non-limiting example, the actuator may be hydraulic based where a pump is operated, for example, via a mechanical connection to the engine of the host-vehicle 12.

In order to provide for active control of the rear-steering-angle 14 so that instances of the object 22 can be avoided, the system 10 also includes a controller 42 in communication with the object-detector 30 and the actuator 40. The controller 42 may include a processor (not specifically shown) such as a microprocessor or other control circuitry such as analog and/or digital control circuitry including an application specific integrated circuit (ASIC) for processing data as should be evident to those in the art. The controller 42 may include memory (not specifically shown), including non-volatile memory, such as electrically erasable programmable read-only memory (EEPROM) for storing one or more routines, thresholds, and captured data. The one or more routines may be executed by the processor to perform steps for determining the location 20 of the object 22 and a travel-path of the host-vehicle 12 based on signals received by the controller 42 from the object-detector 30 as described herein. That is, the controller 42 is generally configured to determine the location 20 of the object 22 relative to the host-vehicle 12 based on information from the object-detector 30, and operate the actuator 40 to avoid the object 22 when the host-vehicle 12 moves, i.e. travels forward or backward around a curve for example.

Figure 2:
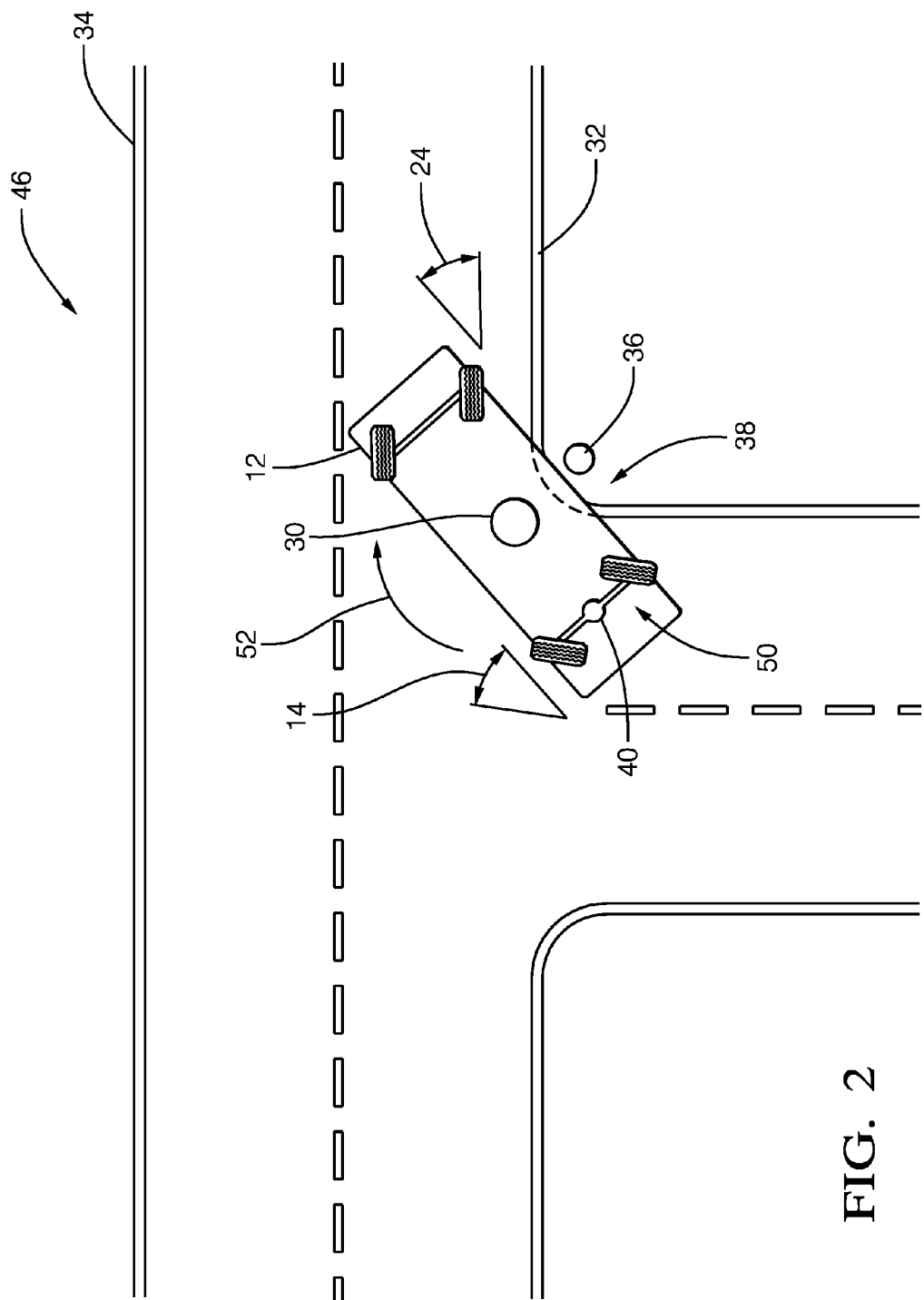
FIG. 2 is an illustration of a traffic-scenario encountered by the system of FIG. 1 in accordance with one embodiment.

FIG. 2 illustrates a non-limiting example of a traffic-scenario 46 where the host-vehicle 12 is characterized as a single-vehicle 48. As used herein, the term 'single-vehicle' is used to indicate instances of vehicles generally intended for stand-alone use, usually built on a single frame. By way of example and not limitation, examples of a single-vehicle include an automobile, a light-duty pickup truck, a van, a large delivery truck, and a bus. Specifically excluded from the list of vehicles characterized as a single-vehicle are heavy-duty semis, i.e. tractor/trailer combinations. However, as will be explained in more detail later, the tractor itself may be characterized as a single-vehicle. For the single-vehicle 48, the actuator 40 is part of a rear-axel assembly 50 of the single-vehicle 48. If the single-vehicle 48 is rear-wheel-drive as are most pick-up trucks, then the rear-axel assembly 50 may be quite similar to the front-axel assembly of a four-wheel-drive truck. If the single-vehicle 48 is front-wheel-drive, then the rear-axel assembly 50 may be quite similar to the front-wheel assembly or steering-wheel assembly found on rear-wheel two-wheel drive type vehicles.

FIG. 2 shows a non-limiting example of the host-vehicle 12 mid-way through executing a turn 52. One instance of the object 22 is the curb 32. That is, the identification 44 of the object 22 is 'curb'. An object-detection function 54 that is part of the controller 42 may be configured to classify the curb as 'low', i.e. lower than some threshold, so the body of the host-vehicle 12 is far enough above the roadway 34 that the curb 32 can pass underneath the body of the host-vehicle 12 as illustrated. However, the controller 42 is preferably configured to control the rear-steering-angle 14 so the rear-wheels do not scrub, go over, 'jump', or contact the curb 32.

Figure 3A:
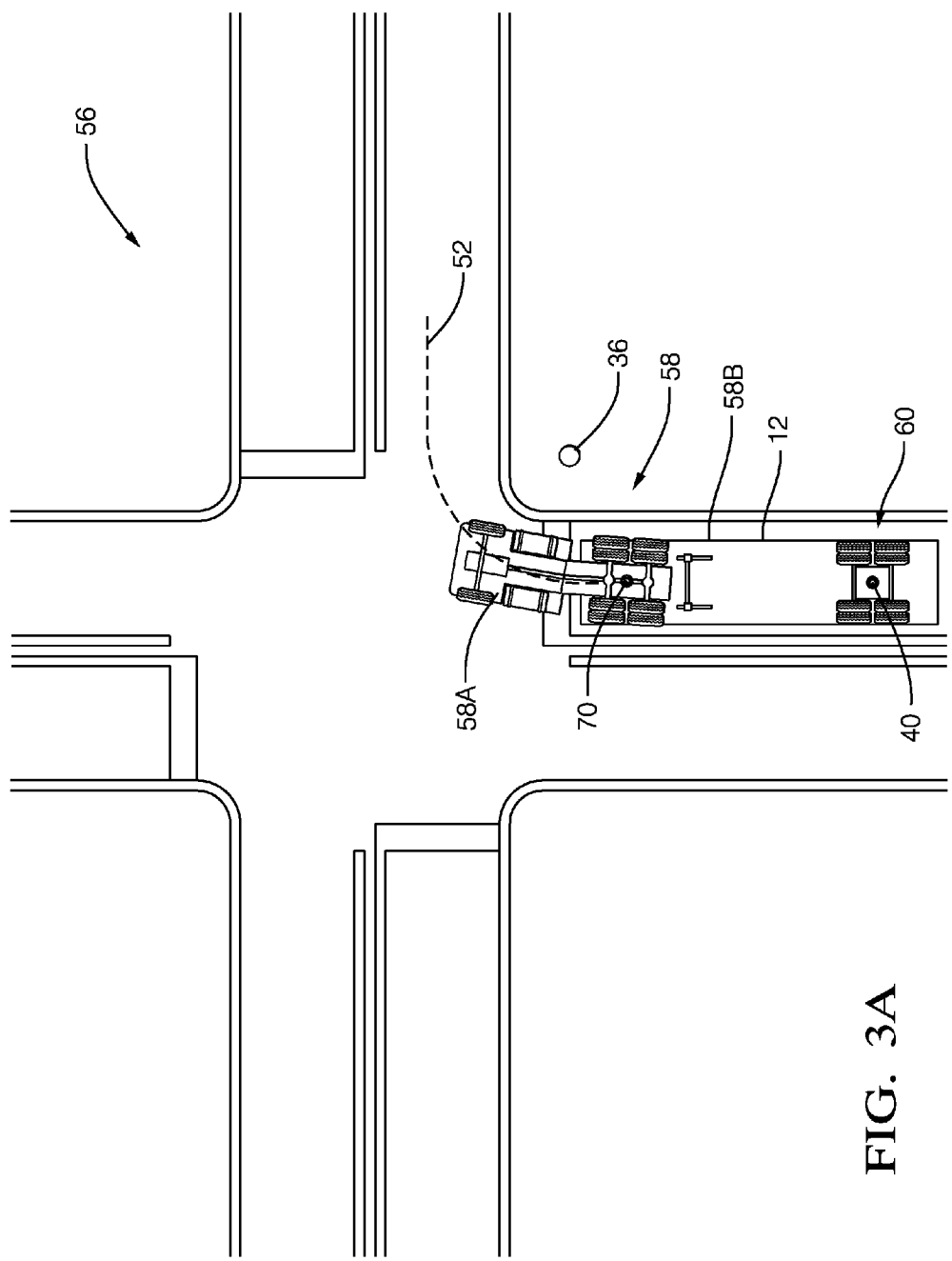
FIGS. 3A, 3B, 3C, and 3D cooperatively form illustration of a traffic-scenario encountered by the system of FIG. 1 in accordance with one embodiment.
Figure 3B:
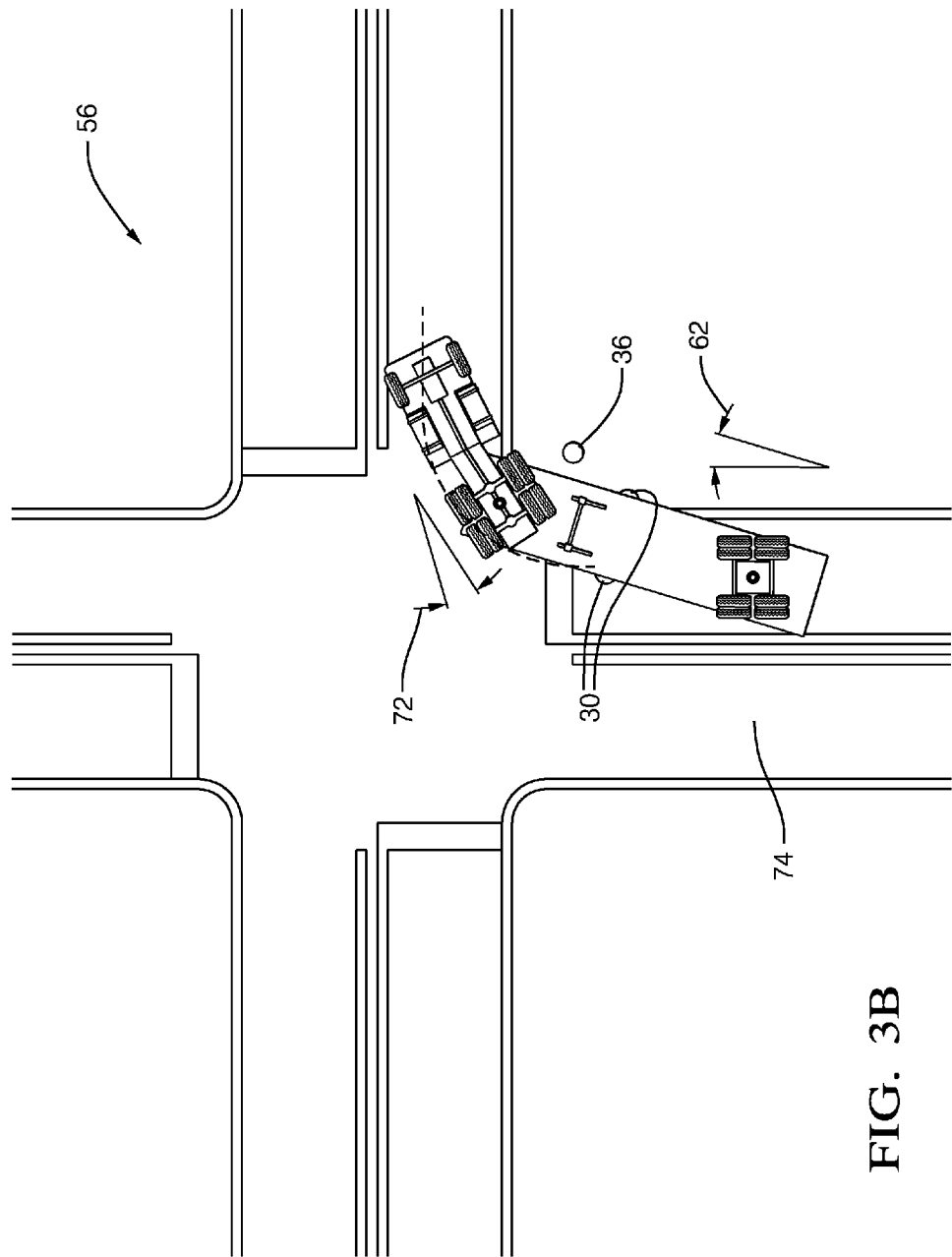
Figure 3C:
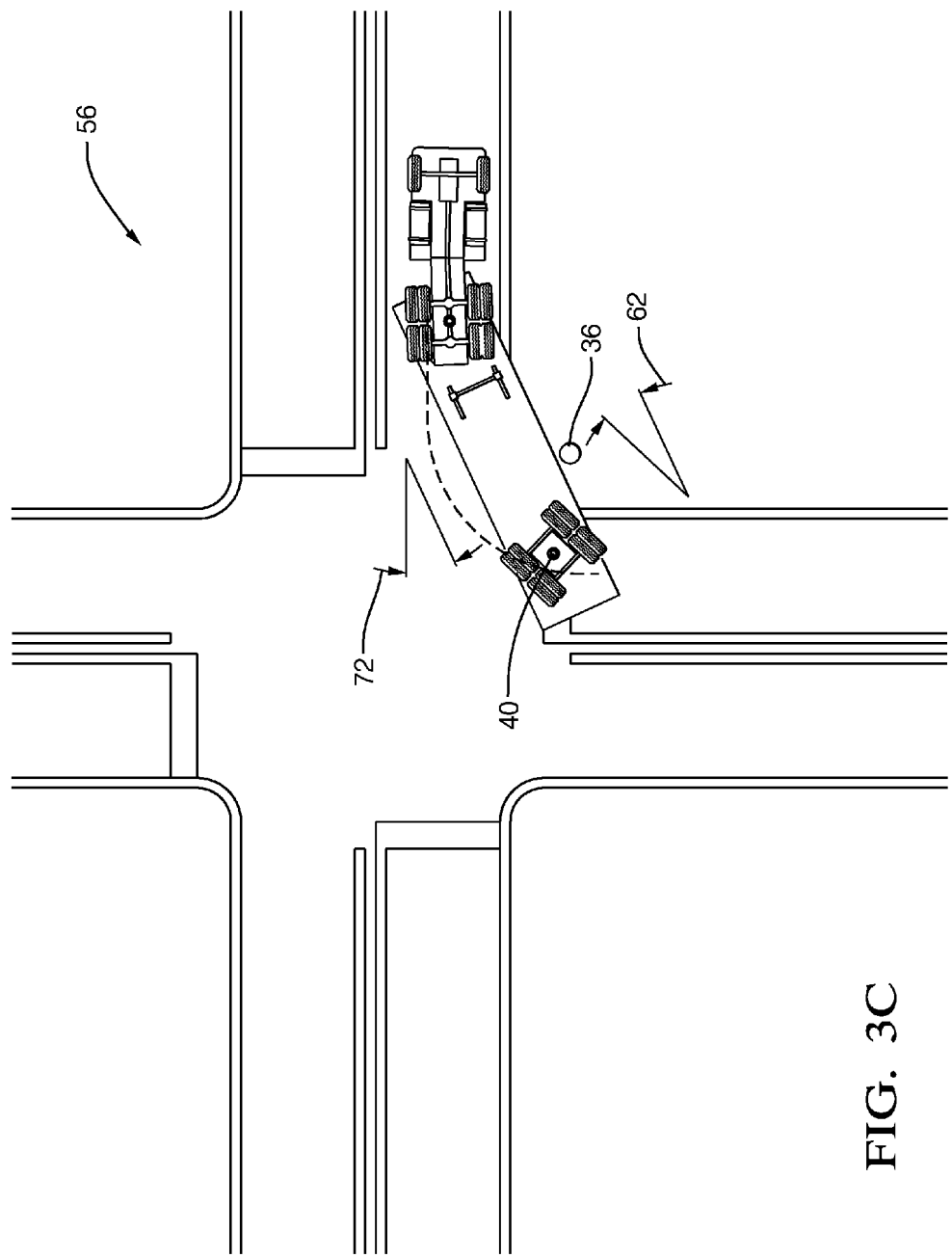
Figure 3D:
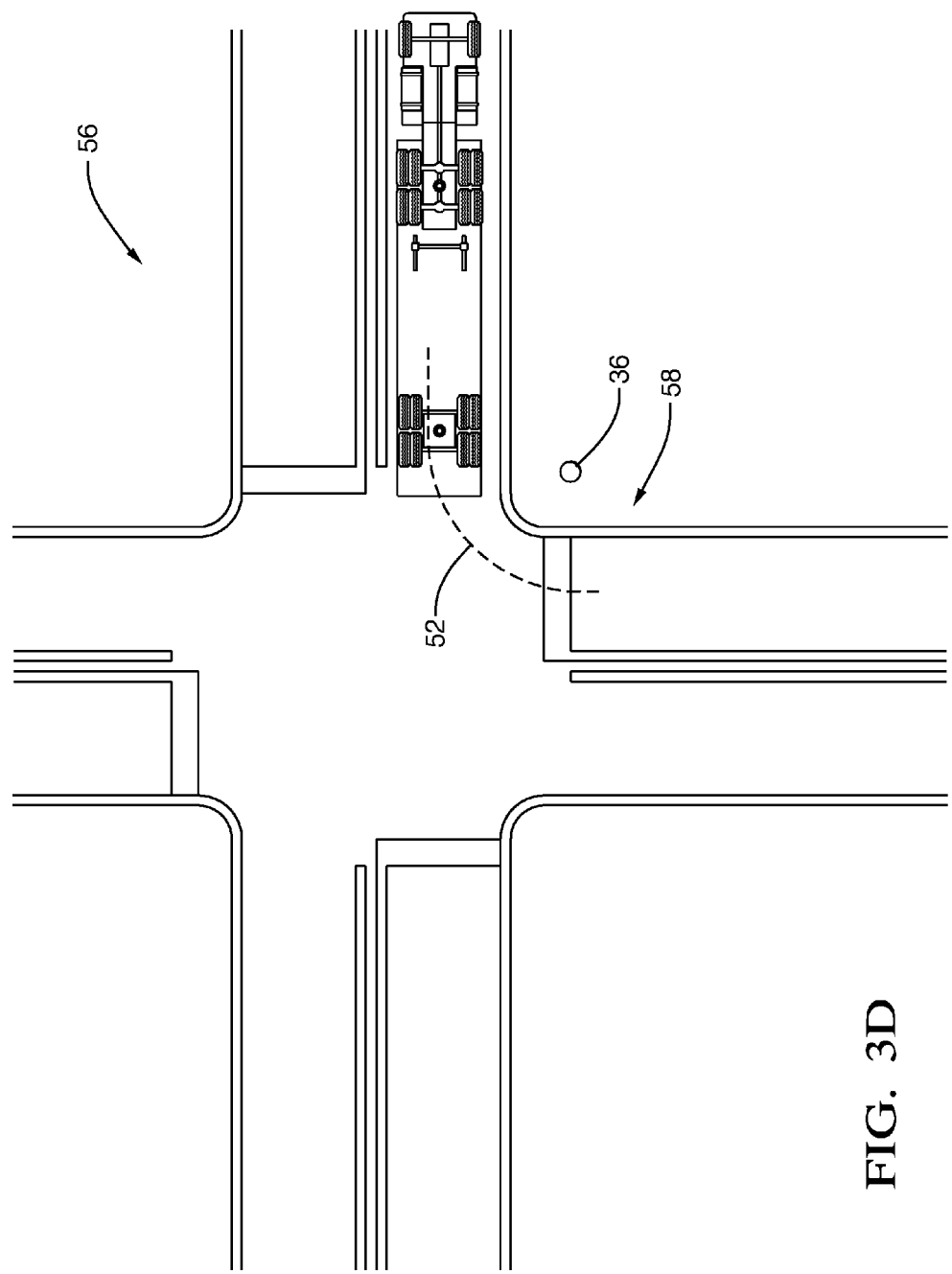

The combination of FIGS. 3A, 3B, 3C, and 3D illustrates a non-limiting example of a turn-sequence 56, where the host-vehicle 12 is characterized as a combination 58 of a tow-vehicle 58A and a trailer 58B. That is, the combination 58 as a whole is the host-vehicle 12, so the rear-wheels of the host-vehicle 12 in this example are the trailer wheels, so the actuator 40 is part of a trailer-axel assembly 60 of the trailer 58B. As can be seen in FIGS. 3B and 3C, the trailer-wheel angle 62 is varied throughout the turn 52 so that the host-vehicle 12, specifically the trailer 58B does not contact the telephone-pole 36.

It is contemplated that the controller 42 may be configured to take some action if the human-operator is steering the tow-vehicle 58A in such a way (e.g. making the turn 52 too tight or too sharp) that it will be impossible for the system 10 to avoid the object, e.g. the telephone-pole 36. By way of example, the system 10 may issue a warning 64 such as an audible-sound and/or synthesized-voice and/or visual indicator that the turn 52 should be taken wider. It is also contemplated that the controller 42 may apply the brakes of the host-vehicle 12 to prevent contact with the object 22.

In another embodiment of the combination 58 of the tow-vehicle 58A and the trailer 58B, the tow-vehicle 58A is equipped with a steering-axel 66 at a front-end of the tow-vehicle 58A, and a drive-axel assembly 68 at a rear-end of the tow-vehicle 58A. The system 10, or more specifically the drive-axel assembly 68 includes a second-actuator 70 used to adjust a drive-angle 72 of the drive-axel assembly 68. That is, both the trailer-axel assembly 60 and the drive-axel assembly 68 of the host-vehicle, i.e. the combination 58, have adjustable steering angles. It follows that the controller 42 is in communication with the second-actuator 70, and the controller 42 is configured to operate the second-actuator 70 in combination or cooperation with the operation of the actuator 40 to avoid the object 22 when the host-vehicle 12 moves. As can be seen in FIGS. 3B and 3C, both the drive-wheel angle 72 and the trailer-wheel angle 62 are varied throughout the turn 52 so that the host-vehicle 12, specifically the trailer 58B does not contact the telephone-pole 36.

While not specifically illustrated in this example, it is contemplated that the trailer-wheel angle 62 could be operated to swing or steer the trailer 58B into an adjacent-lane 74 (FIG. 3B) if necessary to avoid the telephone-pole 36.

Accordingly, a rear-wheel steering system (the system 10), a controller 42 for the system 10, and a method of operating the system 10 is provided. By providing the object-detector 30 suitably located and configured to detect the presence of an object 22 proximate to the host-vehicle 12 that may be contacted by the host-vehicle 12 during a turn, and providing the controller 42 to operate the actuator 40 and/or the second-actuator 70, such contact can be avoided. It is noted that the system 10 is generally configured to minimize the amount or degree that the host-vehicle 12 crosses into the adjacent-lane 74 or any other lanes designated for travel in the same or opposite direction as that of the host-vehicle 12 while performing the turn 52. It should be appreciated that because the host-vehicle 12 is equipped with the rear-wheel steering system described herein, the degree to which the host-vehicle 12 crosses into other lanes will be reduced when compared to a vehicle of similar size that is not equipped with the system 10.

While this invention has been described in terms of the preferred embodiments thereof, it is not intended to be so limited, but rather only to the extent set forth in the claims that follow.

We claim:

1. A rear-wheel steering system suitable for use on an automated vehicle, said system comprising:
   an object-detector used to detect an object proximate to a host-vehicle;
   an actuator used to adjust a rear-steering-angle of rear-wheels of the host-vehicle;

a controller in communication with the object-detector and the actuator, wherein said controller is configured to determine a location of the object relative to the host-vehicle based on information from the object-detector, and operate the actuator to avoid the object when the host-vehicle moves, wherein the host-vehicle is characterized as a combination of a tow-vehicle and a trailer, and the actuator is part of a trailer-axel assembly of the trailer.

2. The system in accordance with claim 1, wherein the tow-vehicle is equipped with a steering-axel at a front-end of the tow-vehicle and a drive-axel assembly at a rear-end of the tow-vehicle, the system includes a second-actuator used to adjust a drive-angle of the drive-axel assembly, the controller is in communication with the second-actuator, and the controller is configured to operate the second-actuator to avoid the object when the host-vehicle moves.

\* \* \* \* \*